(12) United States Patent
Inaba et al.

(10) Patent No.: US 11,679,425 B2
(45) Date of Patent: Jun. 20, 2023

(54) SUBSURFACE SOIL PURIFICATION METHOD

(71) Applicants: TAKENAKA CORPORATION, Osaka (JP); TAKENAKA CIVIL ENGINEERING & CONSTRUCTION CO., LTD., Tokyo (JP)

(72) Inventors: Kaoru Inaba, Inzai (JP); Yuji Yamazaki, Inzai (JP); Takaaki Shimizu, Inzai (JP); Nobuyasu Okuda, Inzai (JP); Yasuhide Furukawa, Inzai (JP); Tomohiro Nakashima, Inzai (JP); Haruka Kiyotomo, Inzai (JP); Kazuhiro Mukai, Inzai (JP); Masafumi Funakawa, Tokyo (JP); Ai Hasegawa, Tokyo (JP); Keisuke Omura, Tokyo (JP); Kota Tanabe, Tokyo (JP)

(73) Assignee: TAKENAKA CIVIL ENGINEERING & CONSTRUCTION CO., LTD., Tokyo (JP)

( * ) Notice: Subject to any disclaimer, the term of this patent is extended or adjusted under 35 U.S.C. 154(b) by 1078 days.

(21) Appl. No.: 16/346,824

(22) PCT Filed: Aug. 29, 2017

(86) PCT No.: PCT/JP2017/031016
§ 371 (c)(1),
(2) Date: May 1, 2019

(87) PCT Pub. No.: WO2018/087995
PCT Pub. Date: May 17, 2018

(65) Prior Publication Data
US 2020/0061683 A1  Feb. 27, 2020

(30) Foreign Application Priority Data
Nov. 8, 2016  (JP) .............................. JP2016-217959

(51) Int. Cl.
*B09C 1/00* (2006.01)
*B09C 1/10* (2006.01)
(Continued)

(52) U.S. Cl.
CPC .................. *B09C 1/10* (2013.01); *B09C 1/02* (2013.01); *B09C 1/08* (2013.01); *B09C 2101/00* (2013.01)

(58) Field of Classification Search
CPC .... B09C 1/10; B09C 1/02; B09C 1/08; B09C 2101/00; B09C 1/002
See application file for complete search history.

(56) References Cited

U.S. PATENT DOCUMENTS 5,829,918 A * 11/1998 Chintis ................. E21B 43/295
405/128.3
5,986,159 A * 11/1999 Aines ........................ B09C 1/06
134/2
(Continued)

FOREIGN PATENT DOCUMENTS

JP   H09-276841 A   10/1997
JP   11057731 A    3/1999
(Continued)

OTHER PUBLICATIONS

JP 2018-550040 Office Action dated Jul. 6, 2021, with machine translation.

*Primary Examiner* — Carib A Oquendo
(74) *Attorney, Agent, or Firm* — Alston & Bird LLP

(57) ABSTRACT

A subsurface soil purification method including: warming an activator liquid, for stimulating decomposer microorganisms that decompose a contaminant in subsurface soil, to a higher temperature than a groundwater temperature, and feeding the activator liquid into the subsurface soil by injecting the activator liquid into an in-ground injection well; warming an activator liquid, for stimulating decomposer microorganisms that decompose a contaminant in subsurface soil, the decomposer microorganisms being infused in the activator liquid, to a higher temperature than a groundwater temperature, and feeding the activator liquid into the subsurface soil by injecting the activator liquid into an in-ground injection well, or warming a purification liquid for decomposing a contaminant in subsurface soil, to a higher temperature than a groundwater temperature, and feeding the purification liquid into the subsurface soil by injecting the purification liquid into an in-ground injection well. The subsurface soil purification method also includes forcing air into the injec- (Continued)

tion well, and feeding the air into the subsurface soil from a position in the injection well that is lower than a position in the injection well for feed-in of the activator liquid or the purification liquid.

13 Claims, 1 Drawing Sheet

(51) Int. Cl.
    *B09C 1/02*    (2006.01)
    *B09C 1/08*    (2006.01)

(56) References Cited

U.S. PATENT DOCUMENTS 8,157,476 B2* 4/2012 Pugh ................ B09C 1/002
    405/128.75
2006/0198704 A1* 9/2006 Kerfoot ................ B09C 1/00
    405/128.5
2007/0116524 A1* 5/2007 Shiau ................ C09K 8/584
    405/128.15
2018/0319685 A1* 11/2018 Ball ................ C02F 1/583
2020/0306808 A1* 10/2020 Hou ................ B09C 1/005

FOREIGN PATENT DOCUMENTS

| | | |
|---|---|---|
| JP | 2002119951 A | 4/2002 |
| JP | 2002250026 A | 9/2002 |
| JP | 2007-253059 A | 10/2007 |
| JP | 2009-112933 A | 5/2009 |
| JP | 2009-154057 A | 7/2009 |
| JP | 2010-000454 A | 1/2010 |
| JP | 2012-125665 A | 7/2012 |
| JP | 2014-205087 A | 10/2014 |
| JP | 2015-077571 A | 4/2015 |
| WO | WO 2018/087995 A1 | 5/2018 |

* cited by examiner

SUBSURFACE SOIL PURIFICATION METHOD

CROSS REFERENCE TO RELATED APPLICATIONS

This application is a National Stage Application, filed under 35 U.S.C. § 371, of International Application No. PCT/JP2017/031016 filed Aug. 29, 2017, which claims priority to Japanese Application No. 2016-217959 filed Nov. 8, 2016; the contents of which are hereby incorporated by reference in their entirety.

BACKGROUND

Technical Field

The present disclosure relates to a subsurface soil purification method for purifying subsurface soil contaminated with a contaminant.

Description of Related Art

One example of a method to purify subsurface soil contaminated by a contaminant is a bio-purification method. Such a method employs an activator liquid containing an activator such as a yeast extract that stimulates decomposition action of decomposer microorganisms to decompose the contaminant present in the subsurface soil. The activator liquid is injected from the upstream side into a contaminated region of the subsurface soil, and the contaminant present in the subsurface soil is decomposed by the stimulated decomposer microorganisms present in the subsurface soil so as to purify the subsurface soil.

For example, in a subsurface soil purification method disclosed in Japanese Patent Application Laid-Open (JP-A) No. 2015-77571, a liquid containing a microorganism nutrient source and a contaminant eluent is fed into ground contaminated by the contaminant through an injection well. The contaminant is eluted and recovered, and decomposition of the contaminant by decomposer microorganisms present underground is also promoted.

BRIEF SUMMARY

However, a contaminant having a lower density than water, such as an oil, benzene, or the like, that has flowed out from a factory or the like and permeated through the ground surface into the subsurface soil accumulates in a proximity band above the groundwater surface in the subsurface soil so as to form subsurface contaminated soil.

However, due to a contaminant having a lower density than water, such as an oil, benzene, or the like, accumulating in the proximity band above the groundwater surface in the subsurface soil, it is difficult to sufficiently spread an activator liquid to such positions, lowering the efficiency of subsurface soil purification.

In consideration of the above circumstances, the present disclosure addresses the issue of raising the efficiency of purification of subsurface soil contaminated by a contaminant having a lower density than water.

A first aspect of the present disclosure is a subsurface soil purification method including: warming an activator liquid, for stimulating decomposer microorganisms that decompose a contaminant in subsurface soil, to a higher temperature than a groundwater temperature, and feeding the activator liquid into the subsurface soil by injecting the activator liquid into an in-ground injection well; warming an activator liquid, for stimulating decomposer microorganisms that decompose a contaminant in subsurface soil, the decomposer microorganisms being infused in the activator liquid, to a higher temperature than a groundwater temperature, and feeding the activator liquid into the subsurface soil by injecting the activator liquid into an in-ground injection well, or warming a purification liquid for decomposing a contaminant in subsurface soil, to a higher temperature than a groundwater temperature, and feeding the purification liquid into the subsurface soil by injecting the purification liquid into an in-ground injection well. The subsurface soil purification method also includes forcing air into the injection well, and feeding the air into the subsurface soil from a position in the injection well that is lower than a position in the injection well for feed-in of the activator liquid or the purification liquid.

In the first aspect of the present disclosure, the specific gravity of the activator liquid or the purification liquid is made less than the specific gravity of the groundwater by warming the activator liquid or the purification liquid. The activator liquid or the purification liquid is accordingly caused to migrate upward in the subsurface soil, enabling a lot of the activator liquid or the purification liquid to be spread to the proximity band above the groundwater surface in the subsurface soil.

Moreover, due to the air being fed from a position on the injection well lower than the position on the injection well for feed-in of the activator liquid or the purification liquid, the activator liquid or the purification liquid is caused to migrate upward in the subsurface soil by the air, enabling even more of the activator liquid or the purification liquid to be spread to the proximity band above the groundwater surface in the subsurface soil.

This enables the efficiency of purifying subsurface soil contaminated with a contaminant having a density lower than that of water, such as an oil, benzene, or the like, to be raised.

A second aspect of the present disclosure is a subsurface soil purification method including: warming an activator liquid, for stimulating decomposer microorganisms that decompose a contaminant in subsurface soil, air bubbles being infused in the activator liquid, to a higher temperature than a groundwater temperature, and feeding the activator liquid into the subsurface soil by injecting the activator liquid into an in-ground injection well; warming an activator liquid, for stimulating decomposer microorganisms that decompose a contaminant in subsurface soil, both air bubbles and the decomposer microorganisms being infused in the activator liquid, to a higher temperature than a groundwater temperature, and feeding the activator liquid into the subsurface soil by injecting the activator liquid into an in-ground injection well; or warming a purification liquid, for decomposing a contaminant in subsurface soil, air bubbles being infused in the purification liquid, to a higher temperature than a groundwater temperature, and feeding the purification liquid into the subsurface soil by injecting the purification liquid into an in-ground injection well.

In the second aspect of the present disclosure, the specific gravity of the activator liquid or the purification liquid is made less than the specific gravity of the groundwater by warming the activator liquid or the purification liquid. The activator liquid or the purification liquid is accordingly caused to migrate upward in the subsurface soil, enabling a lot of the activator liquid or the purification liquid to be spread to a proximity band above the groundwater surface in the subsurface soil.

Moreover, by feeding the activator liquid or the purification liquid infused with air bubbles into the subsurface soil by injection into the injection well, the activator liquid or the purification liquid is caused to migrate upward in the subsurface soil by the air bubbles, enabling more of the activator liquid or the purification liquid to be spread to a proximity band above the groundwater surface in the subsurface soil.

This enables the efficiency of purifying subsurface soil contaminated with a contaminant having a density lower than that of water, such as an oil, benzene, or the like, to be raised.

A third aspect of the present disclosure is a subsurface soil purification method of the first or second aspect further including, prior to performing the warming or forcing processes of the first or second aspect, warming a cleaning liquid, for separating the contaminant from the subsurface soil, to a higher temperature than a groundwater temperature, feeding the cleaning liquid into the subsurface soil by injecting the cleaning liquid into the injection well, and pumping groundwater containing the cleaning liquid, in which the contaminant separated from the subsurface soil has been dissolved, from a water pumping well provided in the ground at a position away from the injection well.

In the third aspect of the present disclosure, a contaminant that is adhered to soil particles in the subsurface soil can be separated from the subsurface soil by the cleaning liquid. Pumping the groundwater containing the cleaning liquid having the contaminant separated from the subsurface soil dissolved therein from the water pumping well purges the separated contaminant from the subsurface soil and enables the subsurface soil to be purified.

Moreover, the subsurface soil can be purified by the contaminant separated from the subsurface soil being decomposed by the decomposer microorganisms stimulated by the activator liquid present in the contaminated soil or by the purification liquid.

Furthermore, making the specific gravity of the cleaning liquid lower than the specific gravity of the groundwater by warming the cleaning liquid causes the cleaning liquid to migrate upward, and enables a lot of the cleaning liquid to be spread to a proximity band above the groundwater surface in the subsurface soil.

The present disclosure configured as described above enables the efficiency of purification of subsurface soil contaminated by a contaminant having a lower density than water to be raised.

DETAILED DESCRIPTION

Figure 1:
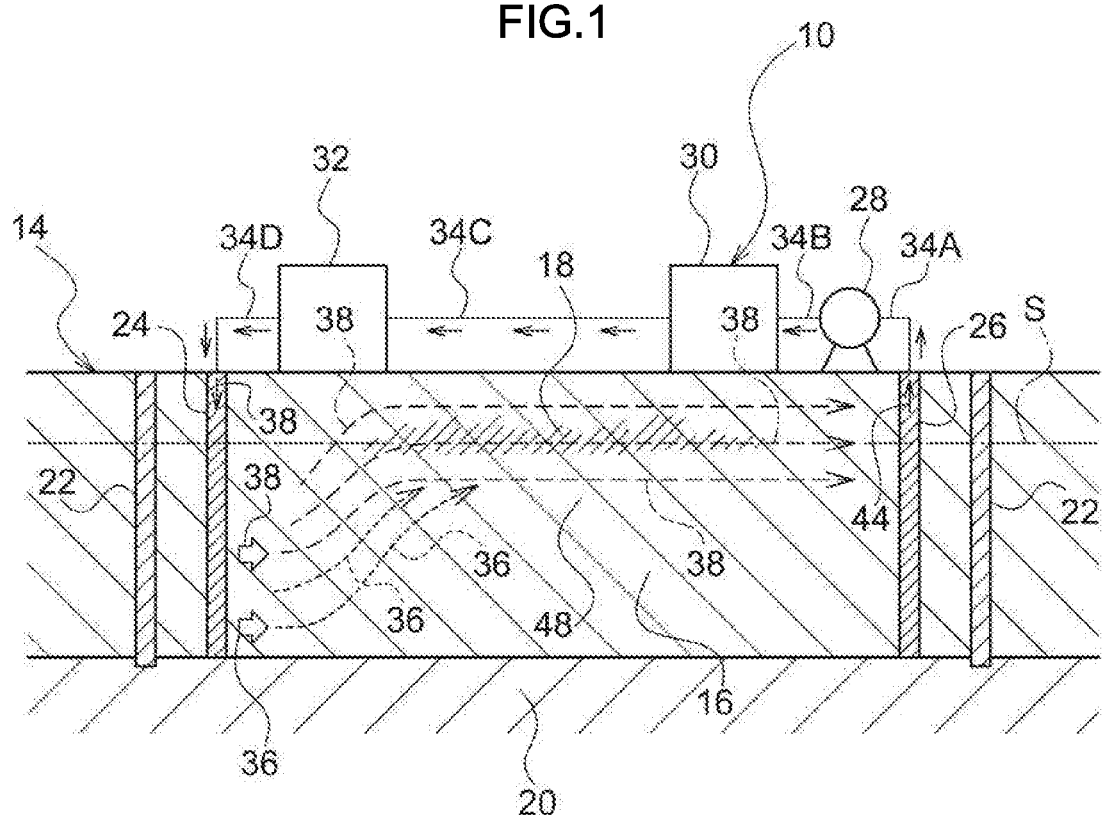
FIG. 1 is a front view cross-section illustrating a flushing purification system according to an exemplary embodiment of the present disclosure.

Explanation follows regarding an exemplary embodiment of the present disclosure, with reference to the drawings. First, explanation follows regarding a subsurface soil purification method according to an exemplary embodiment of the present disclosure. Note that explanation regarding common configuration elements represented by the same reference numerals in plural drawings is sometimes omitted.

Figure 2:
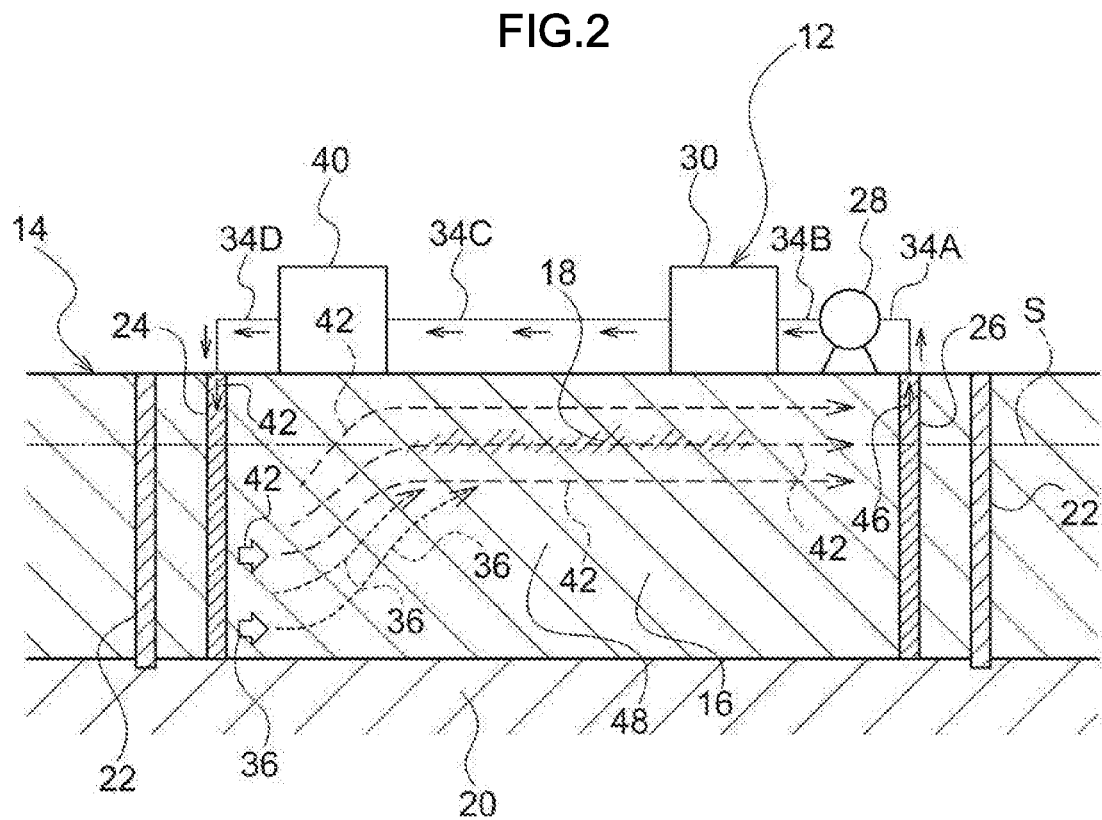
FIG. 2 is a front view cross-section illustrating a contaminant-decomposing purification system according to an exemplary embodiment of the present disclosure.

In the subsurface soil purification method of the present exemplary embodiment, a flushing process is performed first, followed by a contaminant decomposition process. Namely, the flushing process is performed before performing the contaminant decomposition process. A front view cross-section in FIG. 1 illustrates a flushing purification system 10 for performing the flushing process. A front view cross-section in FIG. 2 illustrates a contaminant-decomposing purification system 12 for performing the contaminant decomposition process.

First, explanation follows regarding the flushing purification system 10.

As illustrated in FIG. 1, contaminated soil 18 is present in a proximity band above a groundwater surface S of subsurface soil 48 configuring ground 14. The contaminated soil 18 contains a contaminant such as an oil (for example, a heavy oil, diesel, heating oil, gasoline, or the like), benzene, toluene, xylene, ethyl benzene, or the like.

An aquifer layer 16 is formed below the groundwater surface S, and an aquiclude layer 20 with a lower permeability to water than the aquifer layer 16 is formed below the aquifer layer 16.

The flushing purification system 10 is configured including a water-shielding wall 22, an injection well 24, a water pumping well 26, a pump 28, a water treatment unit 30, and a conditioning tank 32 serving as a tank for warming and conditioning cleaning liquid.

The water-shielding wall 22 is provided within the ground 14 so as to enclose the contaminated soil 18. A lower end portion of the water-shielding wall 22 is embedded in the aquiclude layer 20. The contaminated soil 18 is thereby enclosed and isolated by the water-shielding wall 22 and the aquiclude layer 20. Note that the ground 14 may be configured without the aquiclude layer 20 formed below the aquifer layer 16. In cases in which the ground 14 lacks the aquiclude layer 20, the water-shielding wall 22 is embedded to a sufficient depth such that a contaminant contained in the contaminated soil 18 is isolated by the water-shielding wall 22. Note that the water-shielding wall 22 may be omitted as appropriate.

The injection well 24 and the water pumping well 26 are provided spaced apart from each other within the ground 14 enclosed by the water-shielding wall 22 such that the contaminated soil 18 is disposed between the injection well 24 and the water pumping well 26. Namely, the water pumping well 26 is provided within the ground 14 so as to be spaced apart from the injection well 24.

The water pumping well 26, the pump 28, the water treatment unit 30, the conditioning tank 32, and the injection well 24 are linked together in this sequence by water feed pipes 34A, 34B, 34C, and 34D.

In the conditioning tank 32, a surfactant is mixed into treated water that has been treated in the water treatment unit 30 to generate a cleaning liquid 38. In the conditioning tank 32, the cleaning liquid 38 is warmed to a higher temperature than a normal groundwater temperature by a heater or the like provided inside the conditioning tank 32, after which the warmed cleaning liquid 38 is fed to the injection well 24. It is sufficient to warm the cleaning liquid 38 to a higher temperature than the normal groundwater temperature. The temperature of the cleaning liquid 38 is preferably from 20° C. to 80° C., and more preferably from 25° C. to 60° C.

Note that any configuration may be employed for the cleaning liquid 38 that is capable of separating a contaminant in the contaminated soil 18 (the subsurface soil 48) that is adhered to soil particles in the contaminated soil 18 (the subsurface soil 48), from the contaminated soil 18 (the subsurface soil 48). A negative-ion (namely, an anionic) surfactant, a non-ionic surfactant with an HLB value from 7 to 18, or the like may be used as the surfactant mixed into the treated water to generate the cleaning liquid 38.

Examples of negative-ion surfactants that may be employed include salts of fatty acids, polyoxyalkylene alkylether acetates, alkyl sulfates, polyoxyalkylene alkylether sulfates, polyoxyalkylene alkyl amide ether sulfates, monoglyceride sulfates, olefin sulfonates, alkane sulfonates, acylated isethionates, acylated amino acids, alkylphosphates, polyoxyalkylene alkylether phosphates, and the like.

Examples of non-ionic surfactants that may be employed include polyoxyethylene alkylethers, glycerin fatty acid esters, propylene glycol fatty acid esters, sorbitan fatty acid esters, polyoxyethylene sorbitan fatty acid esters, polyoxyethylene sorbitol tetraoleate, polyoxyethylene polyoxypropylene glycol, polyoxyethylene polyoxypropylene alkylethers, polyethylene glycol fatty acid esters, polyoxyethylene castor oils, polyglycerin fatty acid esters, alkylglycosides, and the like.

Furthermore, instead of a surfactant, a foaming agent, an admixture, an emulsifier, or the like may be mixed into the treated water to generate the cleaning liquid 38.

Examples of foaming agents that may be employed include hydrogen peroxide generators that when dissolved in water dissociate hydrogen peroxide and generate oxygen (for example percarbonates, persulfates, perborates, peracetates, hydrogen peroxide adducts of alkali metal sulfates, hydrogen peroxide adducts of alkaline earth metal sulfates, hydrogen peroxide adducts of urea, hydrogen peroxide adducts of melanin, hydrogen peroxide adducts of amino acids, alkali metal peroxides, alkaline earth metal peroxides, and the like), hydrogen peroxide, and the like.

Examples of admixtures that may be employed include methanol, ethanol, propanol, butanol, acetone, and the like.

Examples of emulsifiers that may be employed include sodium stearoyl lactylate, sucrose fatty acid esters, and the like.

Note that such a surfactant, foaming agent, admixture, emulsifier, or the like does not necessarily need to be mixed into the treated water, and the cleaning liquid 38 may be configured by treated water that has been warmed to a higher temperature than the normal groundwater temperature. Warming the cleaning liquid 38 to a higher temperature than the normal groundwater temperature enables a contaminant in the contaminated soil 18 (subsurface soil 48) that is adhered to soil particles in the contaminated soil 18 (the subsurface soil) to be separated from the contaminated soil 18 (subsurface soil).

The injection well 24 includes a first feed pipe (not illustrated in the drawings) through which the cleaning liquid 38 to be injected passes to feed the cleaning liquid 38 into the subsurface soil 48, and a second feed pipe (not illustrated in the drawings) through which forced air 36 passes to feed the air 36 into the subsurface soil 48.

The feed port of the first feed pipe is provided at a substantially depth direction midway position in the aquifer layer 16, and the feed port of the second feed pipe is provided at position lower than the feed port of the first feed pipe. Namely, the air 36 is fed into the subsurface soil 48 from a position on the injection well 24 lower than the position on the injection well 24 where the cleaning liquid 38 is fed into the subsurface soil 48.

Groundwater 44 is pumped and fed from the water pumping well 26 to the water treatment unit 30 by the pump 28. Water treatment is performed in the water treatment unit 30 to remove the contaminant from the groundwater 44 containing the cleaning liquid 38 in which contaminant has been dissolved.

In the flushing process performed by the flushing purification system 10, first, the cleaning liquid 38 generated and warmed to a higher temperature than the normal groundwater temperature in the conditioning tank 32 is injected into the injection well 24. This thereby feeds the cleaning liquid 38 out from the injection well 24 and into the subsurface soil 48, and the contaminant that is adhered to soil particles in the contaminated soil 18 (the subsurface soil 48) is separated from the contaminated soil 18 (the subsurface soil 48) (a first process).

Moreover, together with the first process, the air 36 is also fed into the subsurface soil 48 by forcing the air 36 into the injection well 24 (a second process).

Then, the groundwater 44, containing the cleaning liquid 38 in which the contaminant separated from the contaminated soil 18 (the subsurface soil 48) is dissolved, is pumped from the water pumping well 26 (a third process).

Next, explanation follows regarding the contaminant-decomposing purification system 12. Explanation regarding similar configuration to that described with respect to the flushing purification system 10 (FIG. 1) is omitted from the following explanation.

As illustrated in FIG. 2, the contaminant-decomposing purification system 12 is configured including the water-shielding wall 22, the injection well 24, the water pumping well 26, the pump 28, the water treatment unit 30, and a conditioning tank 40 serving as a tank for warming and conditioning activator liquid. The contaminated soil 18 is in a state in which soil purification by the flushing process performed by the flushing purification system 10 has progressed, but there is still contaminant contained in the contaminated soil 18 (the subsurface soil 48).

The water pumping well 26, the pump 28, the water treatment unit 30, the conditioning tank 40, and the injection well 24 are linked together in this sequence by the water feed pipes 34A, 34B, 34C, and 34D.

Groundwater 46 is pumped and fed from the water pumping well 26 to the water treatment unit 30 by the pump 28. Water treatment is performed in the water treatment unit 30 to remove the contaminant from the groundwater 46.

In the conditioning tank 40, an activator is mixed into treated water that has been treated in the water treatment unit 30 to generate an activator liquid 42. The activator liquid 42 is warmed to a higher temperature than the normal groundwater temperature by a heater or the like provided inside the conditioning tank 40, after which the warmed activator liquid 42 is fed to the injection well 24.

Any configuration may be employed for the activator liquid 42 that is capable of stimulating the decomposing action of decomposer microorganisms that decompose the contaminant present in the contaminated soil 18 (the subsurface soil 48). For example, a hydrogen releasing agent, an organic substance, a pH adjuster, micronutrients, trace elements, or the like may be employed as the activator mixed into treated water to generate the activator liquid 42.

Examples of organic substances that may be employed include formic acid, acetic acid, propionic acid, butyric acid, lactic acid, or citric acid, sodium salts, potassium salts, or calcium salts thereof, glucose, fructose, galactose, lactose, maltose, trehalose, peptone, triptone, yeast extract, humic acid, plant oils, and the like.

Examples of pH adjusters that may be employed include sodium or potassium carbonates or bicarbonates such as sodium bicarbonate, sodium carbonate, and the like, ammonium hydroxide, ammonium carbonate, sodium tripolyphosphate, disodium phosphate, trisodium phosphate, and the like.

Examples of micronutrients that may be employed include vitamin B12, vitamin B1, pantothenic acid, biotin, folate, and the like.

Examples of trace elements that may be employed include Co, Zn, Fe, Mg, Ni, Mo, B, and the like.

Note that the activator liquid 42 is basically a compound containing at least one out of the organic substances and at least one out of the micronutrients described above as activators. However, other known purification agents may also be added to the activator liquid 42. The TOC concentration of a culture solution of the purification agent is preferably from 50 mg/L to 5000 mg/L, and is more preferably from 100 mg/L to 300 mg/L. However, the TOC concentration does not necessarily need to be within these values.

It is sufficient to warm the activator liquid 42 to a higher temperature than the normal groundwater temperature. The temperature of the activator liquid 42 is preferably from 20° C. to 60° C., and more preferably from 25° C. to 35° C.

The injection well 24 includes a third feed pipe (not illustrated in the drawings) through which the activator liquid 42 to be injected is fed into the subsurface soil 48, and a fourth feed pipe (not illustrated in the drawings) through which the forced air 36 is fed into the subsurface soil 48.

The feed port of the third feed pipe is provided at a substantially depth direction midway position in the aquifer layer 16, and the feed port of the fourth feed pipe is provided at position lower than the feed port of the third feed pipe. Namely, the air 36 is fed into the subsurface soil 48 from a position on the injection well 24 lower than the position on the injection well 24 where the activator liquid 42 is fed into the subsurface soil 48.

In the contaminant decomposition process performed by the contaminant-decomposing purification system 12, the activator liquid 42 generated and warmed to a higher temperature than the normal groundwater temperature in the conditioning tank 40 is injected into the injection well 24. The activator liquid 42 is fed into the subsurface soil 48, and decomposer microorganisms present in the contaminated soil 18 (subsurface soil) are stimulated by the activator liquid 42. The contaminant separated from the contaminated soil 18 (the subsurface soil 48) in the first process is then decomposed by the decomposer microorganisms that have been stimulated by the activator liquid 42 (a fourth process).

Moreover, together with the fourth process, the air 36 is also fed into the subsurface soil 48 by forcing the air 36 into the injection well 24 (a fifth process).

The groundwater 46, containing the activator liquid 42 in which the contaminant separated from the contaminated soil 18 (the subsurface soil 48) has been dissolved, is pumped from the water pumping well 26 (a sixth process).

Explanation follows regarding operation and advantageous effects of the subsurface soil purification method according to the present exemplary embodiment of the present disclosure.

In the flushing process of the flushing purification system 10 of the present exemplary embodiment, as illustrated in FIG. 1, the cleaning liquid 38 is injected into the injection well 24 and the cleaning liquid 38 is fed from the injection well 24 into the subsurface soil 48 so as to flow into the contaminated soil 18. This thereby enables a contaminant that is adhered to soil particles in the contaminated soil 18 (the subsurface soil 48) to be separated from the contaminated soil 18 (the subsurface soil 48). The groundwater 44, containing the cleaning liquid 38 in which the contaminant that has been separated from the contaminated soil 18 (the subsurface soil 48) is dissolved, is pumped up through the water pumping well 26, thereby enabling the separated contaminant to be purged from the contaminated soil 18 (the subsurface soil 48) so as to purify the contaminated soil 18 (the subsurface soil 48). Warming the cleaning liquid 38 to a higher temperature than the normal groundwater temperature enables the solubility of the contaminant in the cleaning liquid 38 to be raised, promoting the separation of the contaminant from the contaminated soil 18 (the subsurface soil 48). This enables the efficiency of purification of the contaminated soil 18 (the subsurface soil 48) to be raised.

In the flushing process performed by the flushing purification system 10 of the present exemplary embodiment, the specific gravity of the cleaning liquid 38 is made less than the specific gravity of the groundwater by warming the cleaning liquid 38. The cleaning liquid 38 is thereby caused to migrate upward, enabling a lot of the cleaning liquid 38 to be spread to the proximity band above the groundwater surface S of the subsurface soil 48.

Furthermore, in the flushing process of the flushing purification system 10 of the present exemplary embodiment, warming the cleaning liquid 38 enables the viscosity of the cleaning liquid 38 to be lowered, thereby enabling the cleaning liquid 38 to reach a wide range of the contaminated region (namely, the contaminated soil 18) more easily.

Moreover, in the flushing process performed by the flushing purification system 10 of the present exemplary embodiment, the air 36 is fed from a position on the injection well 24 lower than the position on the injection well 24 where the cleaning liquid 38 is fed from. The cleaning liquid 38 is accordingly caused to migrate upward by the air 36, enabling a lot of the cleaning liquid 38 to be spread to the proximity band above the groundwater surface S of the subsurface soil 48. This thereby enables the efficiency of purification of the subsurface soil 48 contaminated by the contaminant having a lower density than water, such as an oil, benzene, or the like, to be raised.

Furthermore, in the flushing process performed by the flushing purification system 10 of the present exemplary embodiment, the air 36 is fed from a position on the injection well 24 lower than the position where the cleaning liquid 38 is fed from. This thereby enables oxygen, which is required when decomposer microorganisms are subsequently decomposing a contaminant such as an oil (for example, a heavy oil, diesel, heating oil, gasoline, or the like), benzene, toluene, xylene, ethyl benzene, or the like in the contaminant decomposition process, to be supplied to the proximity band above the groundwater surface S of the subsurface soil 48 so as to prepare a preferable state (namely, a state in which there is sufficient oxygen present).

Moreover, in the flushing process performed by the flushing purification system 10 of the present exemplary embodiment, due to the effect (surfactant effect, mixing effect or emulsifying effect) of the cleaning liquid 38 that has been spread to the proximity band above the groundwater surface S of the subsurface soil 48 by the flushing process, the migrated air 36 arriving at the proximity band above the groundwater surface S in the subsurface soil 48 is able to be suppressed from escaping upward from the proximity band above the groundwater surface S of the subsurface soil 48.

Moreover, in the contaminant decomposition process performed by the contaminant-decomposing purification system 12 of the present exemplary embodiment, as illustrated in FIG. 2, the contaminant that has been separated from the contaminated soil 18 (the subsurface soil 48) in the first process of the flushing process (see FIG. 1) is decomposed by decomposer microorganisms stimulated by the activator liquid 42, thereby enabling the contaminated soil 18 (the subsurface soil 48) to be purified. Furthermore, injecting the activator liquid 42, which has been warmed to a higher temperature than the normal groundwater temperature, into the injection well 24 and feeding the activator liquid 42 into the subsurface soil 48 from the injection well 24 enables the decomposer microorganisms to be further stimulated compared to cases in which activator liquid 42 is injected into the injection well 24 at or below the normal groundwater temperature, thereby promoting decomposition of the contaminant. This enables the efficiency of purification of the contaminated soil 18 (the subsurface soil 48) to be raised.

Moreover, in the contaminant decomposition process performed by the contaminant-decomposing purification system 12 of the present exemplary embodiment, warming the activator liquid 42 enables the viscosity of the activator liquid 42 to be lowered, thereby enabling the activator liquid 42 to reach a wide range of the contaminated region (the contaminated soil 18) more easily.

Furthermore, in the contaminant decomposition process performed by the contaminant-decomposing purification system 12 of the present exemplary embodiment, the specific gravity of the activator liquid 42 is made less than the specific gravity of the groundwater by warming the activator liquid 42. The activator liquid 42 is thereby caused to migrate upward, enabling a lot of the activator liquid 42 to be spread to the proximity band above the groundwater surface S of the subsurface soil 48. Moreover, the air 36 is fed from a position on the injection well 24 lower than the position where the activator liquid 42 is fed from. The activator liquid 42 is accordingly caused to migrate upward by the air 36, enabling more of the activator liquid 42 to be spread to the proximity band above the groundwater surface S of the subsurface soil 48. This thereby enables the efficiency of purification of the subsurface soil 48 contaminated by a contaminant having a lower density than water, such as an oil, benzene, or the like, to be raised.

Moreover, in the contaminant decomposition process performed by the contaminant-decomposing purification system 12 of the present exemplary embodiment, due to the air 36 being fed into the subsurface soil 48 from the injection well 24, a preferable state can be achieved in which oxygen is supplied to the proximity band above the groundwater surface S of the subsurface soil 48 (namely, a state in which there is sufficient oxygen present), thereby enabling the efficiency of decomposing the contaminant (efficiency of purification of the subsurface soil 48) to be raised.

In the subsurface soil purification method of the present exemplary embodiment, as illustrated in FIG. 1 and FIG. 2, after the flushing process has been performed by the flushing purification system 10, the contaminant decomposition process is then performed by the contaminant-decomposing purification system 12. This enables the efficiency of purification of the contaminated soil 18 (the subsurface soil 48) by the contaminant decomposition process to be raised, enabling the time to purify the contaminated soil 18 (the subsurface soil 48) to be shortened. Moreover, by performing the contaminant decomposition process after the contaminant concentration has been lowered by performing the flushing process, the action of the decomposer microorganisms is less liable to be impaired by the toxicity of the contaminant. This enables purification to be performed on contaminated soils with high concentrations of the contamination, which is contaminated soil that has hitherto been difficult to purify using conventional bio-purification methods.

A subsurface soil purification method according to an exemplary embodiment of the present disclosure has been explained above.

Note that although in the present exemplary embodiment, as illustrated in FIG. 1, an example has been given in which, together with feeding the cleaning liquid 38 into the subsurface soil 48 from the feed port of the first feed pipe in the flushing process performed by the flushing purification system 10, the air 36 is also fed into the subsurface soil 48 from the feed port of the second feed pipe at a position lower than the feed port of the first feed pipe, the cleaning liquid 38 may be fed into the subsurface soil 48 from the injection well 24 by injecting the cleaning liquid 38 infused with air bubbles into the injection well 24. For example, a cleaning liquid that is configured by mixing a surfactant or the like into water containing many ultrafine air bubbles (for example, microbubble water) may be fed into the subsurface soil 48 from the injection well 24. In such cases, the position on the injection well 24 where the cleaning liquid is fed into the subsurface soil 48 from the injection well 24 may be any position capable of spreading the cleaning liquid infused with air bubbles to the proximity band above the groundwater surface S of the subsurface soil 48. For example, cleaning liquid may be fed into the subsurface soil 48 from a position on the injection well 24 where the feed port of the first feed pipe or the feed port of the second feed pipe is disposed.

Thus even when the cleaning liquid infused with air bubbles is fed into the subsurface soil 48 from the injection well 24 in this manner, a substantially similar effect can be obtained to the method explained with respect to FIG. 1 in which the cleaning liquid 38 and the air 36 are separately fed from the injection well 24 into the subsurface soil 48.

Namely, a lot of the cleaning liquid can be spread to the proximity band above the groundwater surface S of the subsurface soil 48 by causing the cleaning liquid to migrate upward using the air bubbles infused in the cleaning liquid. This enables a preferable state to be achieved in which oxygen needed in the contaminant decomposition process performed by the contaminant-decomposing purification system 12 is supplied to the proximity band above the groundwater surface S of the subsurface soil 48.

Note that although in the present exemplary embodiment, as illustrated in FIG. 2, an example has been given in which in the contaminant decomposition process performed by the contaminant-decomposing purification system 12, the activator liquid 42 is fed from the injection well 24 into the subsurface soil 48 by injecting the activator liquid 42 that has been warmed to a higher temperature than the normal groundwater temperature into the injection well 24, decomposer microorganisms that decompose the contaminant contained in the contaminated soil 18 (the subsurface soil 48) may be mixed into the activator liquid 42 in the conditioning tank 40, and the activator liquid 42 warmed to a higher temperature than the normal groundwater temperature and injected into the injection well 24. Namely, decomposer microorganisms that decompose the contaminant contained in the contaminated soil 18 (the subsurface soil 48) may be injected into the injection well 24 together with the activator liquid 42, and the activator liquid 42 then fed from the injection well 24 into the subsurface soil 48.

By applying this configuration, the contaminant that has been separated from the contaminated soil 18 (subsurface soil) in the first process of the flushing process (see FIG. 1)

is decomposed by the decomposer microorganisms that have been mixed into the activator liquid 42 and stimulated by the activator liquid 42, thereby enabling the contaminated soil 18 (the subsurface soil 48) to be purified.

Injecting decomposer microorganisms together with the activator liquid 42 from the injection well 24 enables the number of decomposer microorganisms in the contaminated soil 18 (the subsurface soil 48) to be increased, thereby promoting contaminant decomposition. This, for example, enables decomposer microorganisms in the contaminated soil 18 (the subsurface soil 48) to be supplemented after having been depleted by the heat of the warmed cleaning liquid 38 in the flushing process (see FIG. 1).

Furthermore, although in the present exemplary embodiment, as illustrated in FIG. 2, an example has been given in which in the contaminant decomposition process performed by the contaminant-decomposing purification system 12, the activator liquid 42 that has been warmed to a higher temperature than the normal groundwater temperature is injected into the injection well 24 and the activator liquid 42 is fed from the injection well 24 into the subsurface soil 48, a purification agent may be mixed into the treated water that has been treated in the water treatment unit 30 so as to generate a purification liquid in the conditioning tank 40. The purification liquid may then be warmed to a higher temperature than the normal groundwater temperature by a heater or the like provided inside the conditioning tank 40, and the warmed purification liquid injected into the injection well 24. Namely, the purification liquid may be fed from the injection well 24 into the subsurface soil 48 by warming the purification liquid that decomposes the contaminant contained in the contaminated soil 18 (the subsurface soil 48) to a higher temperature than the normal groundwater temperature and injecting the purification liquid into the injection well 24.

By applying this configuration, the contaminant that has been separated from the contaminated soil 18 (subsurface soil) in the first process of the flushing process (see FIG. 1) is decomposed by the purification liquid, thereby enabling the contaminated soil 18 (the subsurface soil 48) to be purified.

Moreover, injecting the purification liquid warmed to a higher temperature than the normal groundwater temperature into the injection well 24 enables the rate of a reaction between the purification agent in the purification liquid and the contaminant to be raised compared to cases in which purification liquid is injected into an injection well at or below the normal groundwater temperature, thereby promoting contaminant decomposition. Examples of purification agents for generating the purification liquid mixed with the treated water include an aqueous hydrogen peroxide solution, iron-based slurry, and the like.

Moreover, although an example has been given in the present exemplary embodiment, as illustrated in FIG. 2, in which in the contaminant decomposition process performed by the contaminant-decomposing purification system 12, together with feeding the activator liquid 42 into the subsurface soil 48 from the feed port of the third feed pipe, the air 36 is also fed into the subsurface soil 48 from the feed port of the fourth feed pipe at a position lower than the feed port of the third feed pipe, the activator liquid 42 may be fed into the subsurface soil 48 from the injection well 24 by warming the activator liquid 42 infused with air bubbles to a higher temperature than the normal groundwater temperature and injecting the activator liquid 42 into the injection well 24. Moreover, the activator liquid 42 may be fed into the subsurface soil 48 from the injection well 24 by taking the activator liquid 42 infused with air bubbles and having decomposer microorganisms for decomposing the contaminant contained in the contaminated soil 18 (the subsurface soil 48) mixed therein, and warming this activator liquid 42 to a higher temperature than the normal groundwater temperature and injecting the activator liquid 42 into the injection well 24. Furthermore, the purification liquid may be fed into the subsurface soil 48 from the injection well 24 by warming the purification liquid infused with air bubbles to a higher temperature than the normal groundwater temperature and injecting the purification liquid into the injection well 24.

For example, an activator liquid with an activator mixed into water containing many ultrafine air bubbles (for example, microbubble water), or a purification liquid with a surfactant mixed into such water, may be fed into the subsurface soil 48 from the injection well 24. In such cases, the position on the injection well 24 where the activator liquid or the purification liquid is fed into the subsurface soil 48 from the injection well 24 may be any position capable of spreading the activator liquid or the purification liquid to the proximity band above the groundwater surface S of the subsurface soil 48. For example, the activator liquid or the purification liquid may be fed into the subsurface soil 48 from a position on the injection well 24 where the feed port of the third feed pipe or the feed port of the fourth feed pipe is disposed.

Thus even when the activator liquid or the purification liquid infused with the air bubbles is fed into the subsurface soil 48 from the injection well 24 in this manner, a substantially similar effect can be obtained to the method explained with respect to FIG. 2 in which the activator liquid 42 and the air 36 are separately fed from the injection well 24 into the subsurface soil 48.

Namely, more of the activator liquid or the purification liquid can be spread to the proximity band above the groundwater surface S of the subsurface soil 48 by the activator liquid or the purification liquid being caused to migrate upward in the subsurface soil 48 using the air bubbles infused into the activator liquid or the purification liquid. This enables a preferable state to be achieved in which oxygen needed in the contaminant decomposition process performed by the contaminant-decomposing purification system 12 is supplied to the proximity band above the groundwater surface S of the subsurface soil 48.

Furthermore, although an example has been given in the present exemplary embodiment where the contaminant is an oil (heavy oil, diesel, heating oil, gasoline, or the like), benzene, toluene, xylene, ethyl benzene, or the like, the subsurface soil purification method of the present exemplary embodiment is a purification method particular effective for a contaminant that accumulates in the proximity band above the groundwater surface S of the subsurface soil 48 to form subsurface contaminated soil. Examples of such contaminants include organic compounds (such as ethyl acetate and volatile organic compounds such as tetrachloroethylene, trichloroethylene, cis-1, 2-dichloroethylene, chloroethylene (vinyl chloride monomers) or the like contained in paint, printer ink, adhesives, cleaners, gasoline, thinners, or the like), metal compounds, inorganic compounds, oils, and so on.

Further, although in the present exemplary embodiment illustrated in FIG. 1 and FIG. 2, an example has been given in which the flushing process (the first process, the second process, and the third process) is performed first, followed by performing the contaminant decomposition process, the contaminant decomposition process may be performed after the first process and the second process. Moreover, the flushing process need not be performed if the contaminated soil 18 (the subsurface soil 48) can be purified by the contaminant decomposition process alone. Furthermore, the contaminant subject to purification in the flushing process and in the contaminant decomposition process may be different from each other.

An exemplary embodiment of the present disclosure has been described above. However, the present disclosure is not limited to the above exemplary embodiment in any way, and obviously various modifications may be implemented within a range not departing from the spirit of the present disclosure.

The disclosure of Japanese Patent Application No. 2016-217959, filed on Nov. 8, 2016, is incorporated in its entirety by reference herein. All cited documents, patent applications, and technical standards mentioned in the present specification are incorporated by reference in the present specification to the same extent as if each individual cited document, patent application, or technical standard was specifically and individually indicated to be incorporated by reference.

The invention claimed is:

1. A subsurface soil purification method comprising:
   warming an activator liquid, for stimulating decomposer microorganisms that decompose a contaminant in subsurface soil, to a higher temperature than a groundwater temperature;
   feeding the activator liquid into the subsurface soil by injecting the activator liquid into an injection well; and
   forcing air into the injection well,
   wherein forcing air into the injection well comprises feeding the air into the subsurface soil from a position in the injection well that is lower than a position in the injection well for feeding the activator liquid; and
   wherein feeding the activator liquid into the subsurface soil and forcing air into the injection well are performed together.

2. The subsurface soil purification method of claim 1, wherein the activator liquid further comprises the decomposer microorganisms.

3. The subsurface soil purification method of claim 1, further comprising, before performing the warming, feeding, or forcing steps:
   warming a cleaning liquid, for separating the contaminant from the subsurface soil, to a higher temperature than a groundwater temperature;
   feeding the cleaning liquid into the subsurface soil by injecting the cleaning liquid into the injection well; and
   pumping groundwater containing the cleaning liquid, in which the contaminant separated from the subsurface soil has been dissolved, into a water treatment unit from a water pumping well provided in the ground at a position away from the injection well.

4. The subsurface soil purification method of claim 1, wherein the activator liquid comprises an activator agent selected from the group consisting of a hydrogen releasing agent, an organic substance, a pH adjuster, micronutrients, and trace elements.

5. A subsurface soil purification method comprising:
   warming a purification liquid, for decomposing a contaminant in subsurface soil, to a higher temperature than a groundwater temperature; and
   feeding the purification liquid into the subsurface soil by injecting the purification liquid into an injection well;
   wherein forcing air into the injection well comprises feeding the air into the subsurface soil from a position in the injection well that is lower than a position in the injection well for feeding the purification liquid; and
   wherein feeding the purification liquid into the subsurface soil and forcing air into the injection well are performed together.

6. The subsurface soil purification method of claim 5, wherein the purification liquid comprises a purification agent selected from the group consisting of hydrogen peroxide, iron-based slurry.

7. A subsurface soil purification method comprising:
   warming an activator liquid, for stimulating decomposer microorganisms that decompose a contaminant in subsurface soil, air bubbles being infused in the activator liquid, to a higher temperature than a groundwater temperature, and
   feeding the activator liquid into the subsurface soil by injecting the activator liquid into an in-ground injection well,
   wherein feeding the activator liquid into the subsurface soil are performed together with forcing air into the injection well.

8. The subsurface soil purification method of claim 7, wherein the activator liquid further comprises the decomposer microorganisms.

9. The subsurface soil purification method of claim 8, further comprising, before performing the warming or feeding steps:
   warming a cleaning liquid, for separating the contaminant from the subsurface soil, to a higher temperature than a groundwater temperature;
   feeding the cleaning liquid into the subsurface soil by injecting the cleaning liquid into the injection well; and
   pumping groundwater containing the cleaning liquid, in which the contaminant separated from the subsurface soil has been dissolved, into a water treatment unit from a water pumping well provided in the ground at a position away from the injection well.

10. The subsurface soil purification method of claim 8, wherein the activator liquid comprises an activator agent selected from the group consisting of a hydrogen releasing agent, an organic substance, a pH adjuster, micronutrients, and trace elements.

11. A subsurface soil purification method comprising:
    warming a purification liquid, for decomposing a contaminant in subsurface soil, air bubbles being infused in the purification liquid, to a higher temperature than a groundwater temperature; and
    feeding the purification liquid into the subsurface soil by injecting the purification liquid into an in-ground injection well,
    wherein feeding the purification liquid into the subsurface soil are performed together with forcing air into the injection well.

12. The subsurface soil purification method of claim 11, wherein the purification liquid comprises a purification agent selected from the group consisting of hydrogen peroxide, iron-based slurry.

13. The subsurface soil purification method of claim 11, further comprising, before performing the warming or feeding steps:
    warming a cleaning liquid, for separating the contaminant from the subsurface soil, to a higher temperature than a groundwater temperature;

feeding the cleaning liquid into the subsurface soil by injecting the cleaning liquid into the injection well; and pumping groundwater containing the cleaning liquid, in which the contaminant separated from the subsurface soil has been dissolved, into a water treatment unit from a water pumping well provided in the ground at a position away from the injection well.

\* \* \* \* \*

UNITED STATES PATENT AND TRADEMARK OFFICE
CERTIFICATE OF CORRECTION

PATENT NO. : 11,679,425 B2
APPLICATION NO. : 16/346824
DATED : June 20, 2023
INVENTOR(S) : Kaoru Inaba et al.

It is certified that error appears in the above-identified patent and that said Letters Patent is hereby corrected as shown below:

On the Title Page

Item (73), Assignee, "TAKENAKA CIVIL ENGINEERING & CONSTRUCTION CO., LTD., Tokyo (JP)" should read -- TAKENAKA CORPORATION, Osaka (JP); TAKENAKA CIVIL ENGINEERING & CONSTRUCTION CO., LTD., Tokyo (JP) --.

Signed and Sealed this
Seventeenth Day of October, 2023

Katherine Kelly Vidal
*Director of the United States Patent and Trademark Office*